March 26, 1963

R. LIVINGSTON 3,082,947

CATAMENIAL INDICATORS

Filed June 27, 1960

INVENTOR.
ROBERT LIVINGSTON
BY

ATTORNEY

March 26, 1963  R. LIVINGSTON  3,082,947
CATAMENIAL INDICATORS
Filed June 27, 1960  3 Sheets-Sheet 2
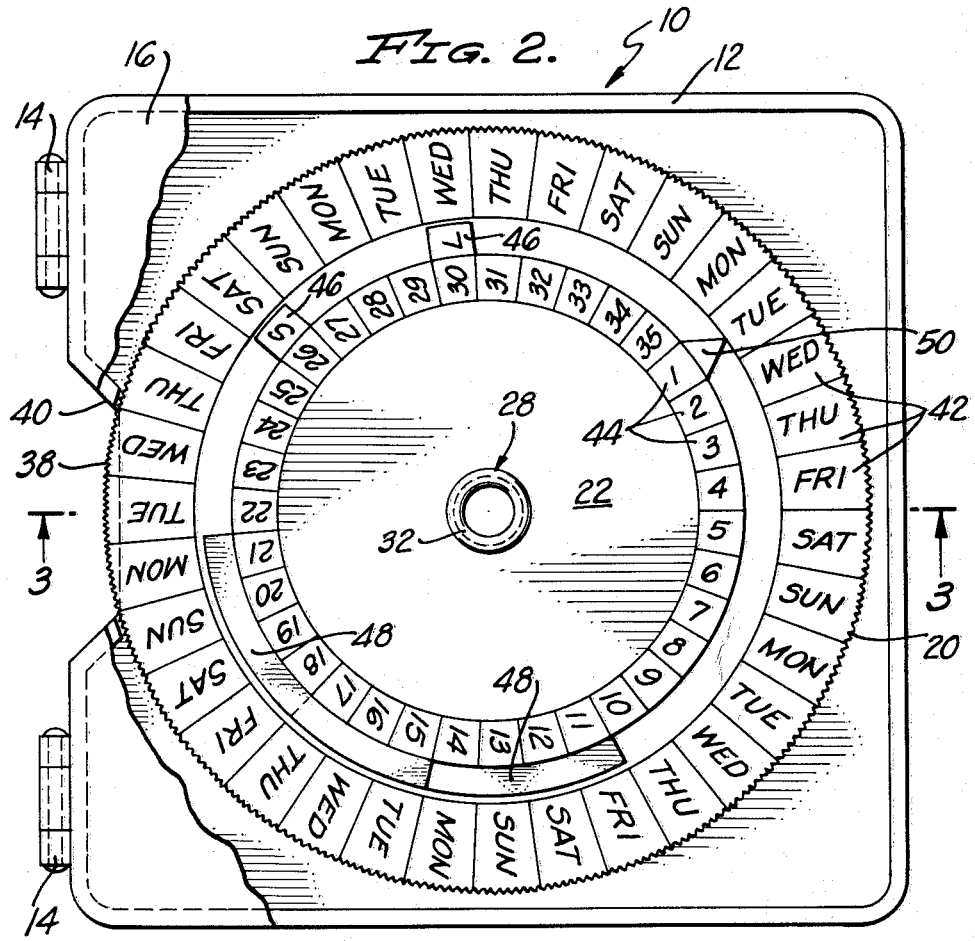
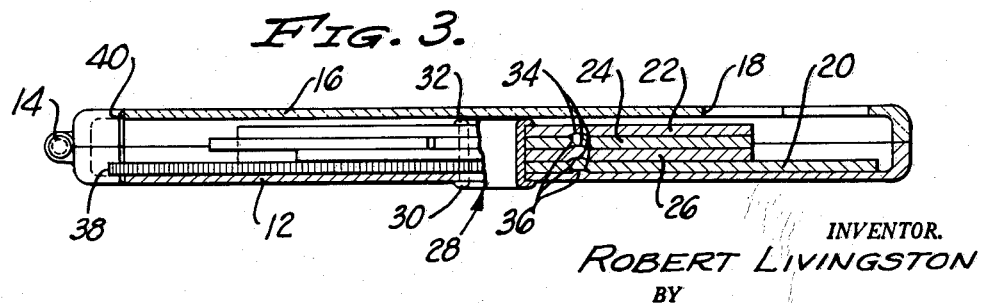
INVENTOR.
ROBERT LIVINGSTON
BY
ATTORNEY

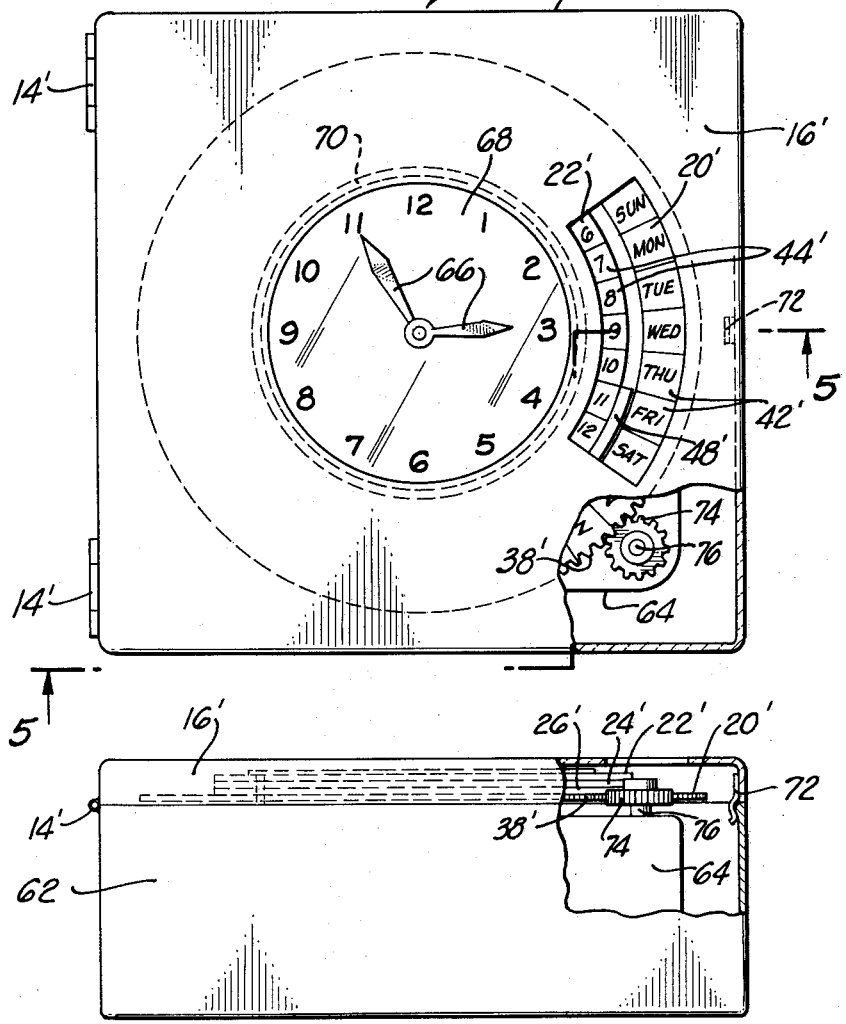

United States Patent Office 3,082,947
Patented Mar. 26, 1963

3,082,947
CATAMENIAL INDICATORS
Robert Livingston, 13075 Blairwood Drive,
North Hollywood, Calif.
Filed June 27, 1960, Ser. No. 38,845
9 Claims. (Cl. 235—88)

This invention pertains to new and improved catamenial indicators for indicating particular days or significant phases of the menstrual cycle. This application is a continuation-in-part of the co-pending application Serial No. 607,048 filed August 30, 1956, now abandoned, entitled Catamenial Indicators. The entire disclosure of this copending application is incorporated in this specification by reference.

A number of different types of catamenial indicators are known. These devices are intended to be used in determining particular days or various significant periods in the menstrual cycle. Certain religious groups utilize devices of this type for what, in effect, are contraceptive purposes. Devices of this general category are also utilized in order to determine when the chances of pregnancy are the greatest in order to promote this condition. Further, the catamenial devices can be utilized to indicate when various drugs affecting female hormone balance, ovulation or the like should be taken.

Prior devices for these purposes can be considered more or less successful for the purposes intended. However, they suffer from certain inherent disadvantageous or difficulties which have limited their utility. In general, prior catamenial indicators have operated by determining various sequences of days and have not correlated such sequences to the days of the week. As a consequence of this, and as a consequence of their relative complexity they have not been effectively used to the maximum possible extent. Frequently, where prior catamenial indicators have been used they have been used inaccurately since the average woman will not take the trouble to completely master the relatively complex character of these prior devices.

A broad object of the present invention is to provide new and improved catamenial indicators. A further objective of the present invention is to provide catamenial indicators which are very simple to use in that they relate days or periods in a menstrual cycle to days of the week so as to facilitate any woman using these devices. Another objective of the present invention is to provide catamenial indicators which may be easily and inexpensively constructed.

Still further objects of this invention, as well as many specific advantages of it will be more fully apparent to those skilled in the art to which this invention pertains from a detailed consideration of the remainder of this descripion including the appended claims and the accompanying drawings in which:

FIG. 2 is a front elevational view, partially in section, of a catamenial indicator of this invention;

FIG. 3 is a cross-sectional view taken at line 3—3 of FIG. 2;

FIG. 4 is a front elevational view, partially in section, of a further catamenial indicator of this invention; and FIG. 5 is a cross-sectional view taken at line 5—5 of FIG. 4.

Figure 1:
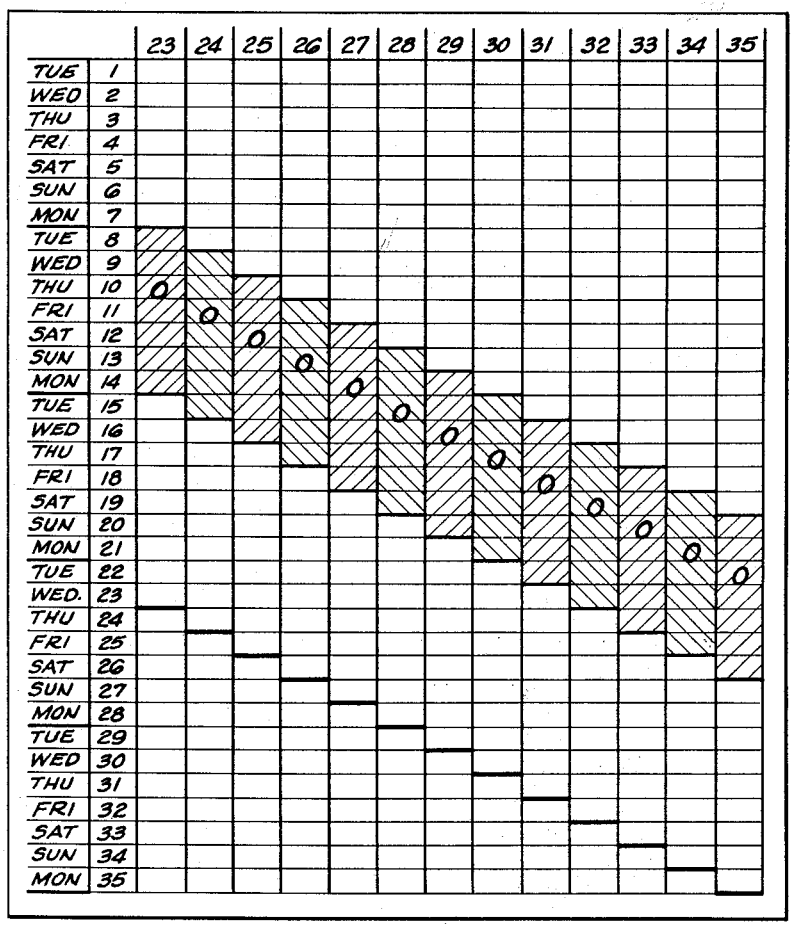
FIG. 1 is a chart indicating particular days and periods of the menstrual cycle and indicating how these days and periods vary.

In all figures of the drawings like numerals are used to designate like parts, wherever convenient for purposes of illustration and explanation. The relative sizes of various parts of the catamenial indications illustrated are exaggerated in certain figures of the drawings for convenience of explanation.

It is to be understood that the accompanying drawings are not to be taken as limiting this invention in any respect. Those familiar with the field of mechanics will realize that a number of differently appearing and differently constructed catamenial indicators may be created utilizing the essential features and principles of this invention by the exercise of routine engineering and designing skill and ability.

As an aid to understanding this invention it can be stated in essentially summary form that it concerns catamenial indicators each of which includes first, second, third and fourth endless members which are mounted upon a base so that they may be moved both independently of each other for setting purposes and so that they may be moved in synchronism with each other. In accordance with this invention the first of these means is formed so as to indicate a series of weekly units, and each of these weekly units is subdivided into sections representing the days of an individual week represented by it. With the catamenial indicators of this invention the second of these means are provided with a series of consecutively numbered sections corresponding in number to the number of sections representing days on the first of the means recited. The third and fourth means used are provided with setting levers which are adapted to be used in rotating these third and fourth means in order to indicate a range of variation in a normal menstrual cycle. Further, these third and fourth means are provided with indicating portions which are adapted to overlie one another so as to indicate specific days upon which significant phases of the menstrual cycle occur. The setting levers and the indicating portions on the third and fourth means are, in catamenial indicators as herein described, mounted so as to be visible in conjunction with the sections on the first and second means recited. Thus, in utilizing catamenial indicators of the present invention a person can determine particular days or phases of the menstrual cycle by viewing the relative positions of the first, second, third and fourth means indicated in conjunction with one another.

This invention is best more fully explained by referring directly to the drawings. The chart shown in FIG. 1 of the drawings indicates, as summarized in the aforegoing brief summary of the drawings, particular days and periods of the menstrual cycle. Above the horizontal axis in this chart there are indicated menstrual cycles of various different common durations. Along the vertical axis in this chart there are indicated days from the beginning of a menstrual cycle with the numeral 1 indicating the beginning of menstruation. In the chart the letters "O" in the various vertical columns indicate days when during menstrual cycles of the duration indicated ovulation should at least theoretically be expected. The horizontal lines directly above and below these letters "O" which are separated by cross-hatching indicate a normal variation in the days when ovulation will occur within a specific menstrual cycle. The horizontal lines at the bottoms of the vertical columns in this chart indicate the initial days when menstruation will normally commence after ovulation.

From this chart it will be seen that women vary considerably as to the periods when ovulation is apt to occur. In general, the longer the menstrual period the greater time from the beginning of menstruation to ovulation. This variation is not proportionate to the time duration of a menstrual cycle but is related to the times at which menstruation will occur. In this connection with this variation it is to be noted that medical authorities differ slightly as to the duration of fertile periods during menstruation. The accompanying chart indicates such periods in accordance with what is considered to be reliable present day medical belief.

In accordance with the present invention the times and periods indicated in the chart shown in FIG. 1 are interrelated in a simple catamenial indicator so that a woman may readily determine particular days and periods within the menstrual cycle. Further, in catamenial indicators of the present invention allowance is made for the fact that a woman will frequently have menstrual periods of different durations. With the catamenial indicators of the present invention a period of ovulation or fertility is indicated not for a menstrual cycle of any specific duration, but for the variations in menstrual cycles which a woman may in fact experience. This interrelationship is accomplished in the present invention through the use of structures such as are described in connection with FIGS. 2 through 5 of the drawings.

In FIG. 2 of the drawings there is shown a catamenial indicator 10 of the present invention which includes a base 12 formed of styrene, cellulose acetate, cardboard or various other similar materials. Hinges 14 at one side of this base 12 connect it with a cover 16 which, in the embodiment of the invention illustrated, is formed out of a colored yet transparent material, such as, for example, styrene tinted a light shade of gray. Within a portion of this cover 16 there is located a window 18 through which various portions of the discs 20, 22, 24 and 26 may be viewed. These discs 20, 22, 24 and 26 are mounted concentrically with respect to one another about a common axis through the use of a hollow rivet 28 having a flange 30 overlying the exterior of the base 12. Another similar flange 32 overlies the discs 20, 22, 24 and 26 so as to resiliently hold these discs in frictional engagement with one another. It is to be noted however, that the flange 32 is of a sufficiently resilient character so as to permit relative rotation between the discs 20, 22, 24 and 26.

Normally such relative rotation between these discs is prevented by means of small detents or bumps 34 on the base 12 and the discs 20, 24 and 26 fitting within correspondingly shaped depressions 36 in the discs 20, 22, 24 and 26. A plurality of these detents and depressions, 34 and 36 respectively, are used equi-distant from one another around the axis of rotation of the discs 20, 22, 24 and 26 so that in any desired positions of these discs they are in effect locked together so as to turn in synchronism with one another. Thus, the small detents or bumps 34 and the depressions 36 serve as coupling means for retaining the discs 20, 24 and 26 in a set relation to one another. The material from which the discs 20, 22, 24 and 26 are made is preferably resilient enough to permit rotation between these discs and the base 12. The resilient character of the flange 32 also permits such relative rotation.

The disc 20 is provided with a knurled exterior edge 38 which is normally exposed between cut-out portions 40 in the cover 16 and the base 12 between the hinges 14. This knurled exterior edge 38 may be easily engaged by a digit of a hand so as to cause simultaneous rotation of the entire sequence of discs described. During the use of the indicator 10 the discs 20, 22, 24 and 26 are rotated in synchronism with one another once each day so as to enable successive indicia to be viewed through the window 18.

The indicia so viewed are formed upon all of the discs 20, 22, 24 and 26. The disc 20 is formed so that its periphery is divided into a plurality of equally dimensioned sections 42, the number of such sections corresponding to a multiple of the number of days in a series of seven-day weekly periods. On the disc 22 directly opposite the sections 42 there are provided a corresponding number of consecutively numbered sections 44. The discs 24 and 26 are each provided with setting levers 46 and with peripheral indicating portions 48. It will be noted that the indicating portions 48 overlie one another so that only a part of one of the indicating portions 48 is exposed at any one time. Preferably the indicating portions 48 each extend around the axis of rotation of the discs 20, 22, 24 and 26 a length corresponding to the distance around this axis of seven of the sections 44 or the sections 42. Thus, each of the indicating portions 48 is of a length corresponding to the duration of time within which ovulation may occur for a menstrual cycle of any given duration. Further, these indicating portions are separated from their corresponding setting levers 46 by a number of such sections corresponding to the interval shown in the chart in FIG. 1 between the period when ovulation is apt to occur and the beginning of a menstrual cycle. If desired, the indicating portions 48 may be colored some indicative color such as red, green or the like. If desired, these indicating portions may be formed out of transparent material so as to overlie either adjacent sections 44 or 42.

When the catamenial indicator 10 is to be used the cover 16 is open. At this point the discs 20, 24 and 26 are held in place while the disc 22 is rotated with respect to them so that the section 44 numbered 1 is directly opposite the section 42 marked with the day of the week upon which a menstrual cycle closes. If desired, a pointer 50 may be formed on the disc 22 so as to facilitate this setting operation.

Next, the setting levers 46 are located opposite the sections 44 marked so as to contain the numerals indicating the long and short menstrual cycles of an individual. If desired, these setting levers 46 may be marked with the letters "S" and "L" as indicated in FIG. 2 of the drawing so as to facilitate the use of the complete indicator 10. As these levers 46 are moved in this manner the disc 20 is held so that it does not move with respect to the disc 22. Also as these levers 46 are moved in this manner, the relative positions of the indicating portions 48 are, of course, changed.

At this point the complete assembly of discs 20, 22 and 24 is rotated through the use of the knurled edge 38 so that the sections 42 and 44 containing the numeral 1 and the day of the week opposite this numeral are visible through the window 18. Thereafter the cover 16 is closed.

The individual using the indicator 10 then moves the assembly of discs 20, 22 and 24 so that successive numerals on the sections 44 are visible. As this occurs, different days of the week are of course visible through this window 18. Because of the fact that the days of the week are always visible an individual may readily correlate the indications obtained through the use of this indicator 10 with the normal weekly periods of life and will be in a position to determine from the indicator 10 when periods of probable ovulation or menstruation will commence. When the indicating portions 48 become visible through the window 18 as the indicator 10 is used appropriate action may be taken by an individual using this indicator. Thus, for example various drugs which are normally taken during periods of probable ovulation may be taken when the indicating portions 48 are visible.

In FIGS. 4 and 5 of the drawings there is shown a further catamenial indicator 60 of the present invention. This indicator 60 uses parts which are identical to, or substantially identical to various parts of the indicator 10 previously described. For convenience of explanation such parts are not separately described here and are indicated in this specification and in the drawings by the primes of the numerals previously used.

The indicator 60 differs from the indicator 10 inasmuch as it includes a housing 62 containing a conventional clock-work type mechanism 64 which serves to drive hands 66 with respect to a clock face 68. This clock face 68 is located within the interior of a central, enlarged cylindrical bearing 70 corresponding to the rivet 28 previously described in its function. This bearing 70 rotatably holds discs 20', 22', 24' and 26'; in the indicator 60 these discs may be termed rings inasmuch as they are rotatably mounted on an enlarged bearing 70 instead of upon a simple conventional hollow rivet, such as the rivet 28. A cover 16' is mounted upon the housing 62 by means of hinges 14' so that this cover may be moved into and out of position. A conventional latch 72 is located within the cover 16'.

In the indicator 60 the knurled edge 38' is preferably formed so that the knurlings on it serve as a gear coacting with corresponding gear teeth 74 formed on a shaft 76 which extends from the clock-work mechanism 64. With this construction the clock-work mechanism 64 is constructed in a known manner so that once each day the shaft 76 operates so as to move a new set of sections 42' and 44' so that the same are visible through the window 18' in the cover 16'.

It will be realized from a detailed consideration of the aforegoing that the indicator 60 differs from the indicator 10 primarily in the manner in which this indicator is operated. The indicator 60 is designed so as to relieve an individual of the necessity of manually turning or moving portions of the indicator once each day in order to determine certain days or periods of the menstrual cycle by utilizing a motor drive forming a part of a clock-work mechanism 64 for this purpose.

Those skilled in the art to which this invention pertains will realize that catamenial indicators such as the indicators 10 and 60 herein described are very simple devices which may be readily used by an average person. They will further realize that the use of these indicators is facilitated to a decided extent because of the fact that these indicators are of an "uncomplicated" variety and relate days and periods of a menstrual cycle to the days of the week. This eliminates much of the complicated counting and calculating necessary in the use of the prior related devices.

Those skilled in the art to which this invention pertains will also realize that a catamenial indicator as herein described may be altered and modified in accordance with routine engineering skill so as to change various means pertaining to their appearance, manufacture, etc., without departing from the true scope of the invention as set forth in the appended claims forming a part of this disclosure.

I claim:

1. A catamenial indicator which includes: base means; first endless means formed so as to represent at least one weekly unit, said weekly units in said first endless means being divided so as to represent the days of the week, said first endless means being independently mounted on said base means so as to be capable of being moved; second endless means formed so as to contain numerals representing a series of days corresponding to the maximum possible duration of a menstrual cycle, said second endless means being independently mounted on said base adjacent to said first endless means so as to be capable of being moved with respect to said first endless means; third and fourth endless means independently mounted on said base means adjacent to said first and second endless means so as to be capable of being moved with respect to said first and second endless means, said third and said fourth endless means each including a setting lever and an indicating portion, said third and fourth endless means being located adjacent to said first and said second endless means so that said setting levers are exposed and so that said indicating portions may be moved with respect to each other by movement of said setting levers and with respect to said first and said second endless means, said indicating portions being formed on said third and fourth endless means so as to overlie one another so as to indicate the duration of a period during a menstrual cycle; coupling means for retaining said first, second, third and fourth endless means in a set relation to one another; means for moving said first, second, third and fourth endless means in synchronism with one another; and means formed on said base for permitting adjacent portions of said first, second, third and fourth endless means to be periodically viewed in their respective positions with respect to one another as said first, second, third and fourth endless means are rotated in synchronism with one another.

2. A catamenial indicator as defined in claim 1 wherein each of said endless means is a disc and wherein said discs are rotatably mounted concentric with one another about a common axis.

3. A catamenial indicator as defined in claim 1 wherein each of said endless means is a ring and wherein said rings are located concentric with one another about a common axis.

4. A catamenial indicator which includes: a mounting member; a bearing held by said mounting member; a first, second, third and fourth circular member rotatably mounted on said bearing, the peripheries of said circular member being formed so as to include a plurality of equally dimensioned sections, said sections representing a plurality of weekly units, each of said sections being labelled so as to represent a day of the week, said second circular member being formed so that the periphery thereof is divided into a plurality of consecutively numbered sections, the number of sections in said second circular member corresponding to the number of sections in said first circular member, said third and fourth circular members each including a setting lever and an indicating portion, said setting levers being located so as to be visible at the peripheries of said first and said second circular members and being of a dimension corresponding to the dimensions of said sections of said first and second circular members, said indicating portions overlying one another and extending a length corresponding to the length of a plurality of sections of said first and second circular members and being visible in conjunction with said sections on said first and second circular members; coupling means for retaining said first, second, third and fourth circular members in a set relation to one another; means for moving first, second, third and fourth circular members in synchronism with one another; and means formed on said base for permitting adjacent sections of said first, second, third and fourth circular members to be periodically viewed in their respective positions with respect to one another.

5. A catamenial indicator as defined in claim 4 wherein said coupling means comprises cooperating detent and depression means formed adjacent to each other on said first, second, third and fourth circular members, said detent and depression means interconnecting said first, second, third and fourth circular members so that when one of said circular members is rotated the remainder of said circular members are caused to rotate in synchronism with said one of said circular members and being capable of allowing said circular members to be rotated independently of one another.

6. A catamential indicator as defined in claim 4 wherein said circular members comprise discs.

7. A catamenial indicator as defined in claim 4 wherein said circular members comprise rings.

8. A catamenial indicator which includes: a mounting member; a bearing held by said mounting member; a first, second, third and fourth circular member rotatably mounted on said bearing, the peripheries of said circular member being formed so as to include a plurality of equally dimensioned sections, said sections representing a plurality of weekly units, each of said sections being labelled so as to represent a day of the week, said second circular member being formed so that the periphery thereof is divided into a plurality of consecutively numbered sections, the number of sections in said second circular member corresponding to the number of sections in said first circular member, said third and fourth circular members each including a setting lever and an indicating portion, said setting levers being located so as to be visible at the peripheries of said first and said second circular members and being of a dimension corresponding to the dimensions of said sections of said first and second circular members, said indicating portions overlying one another and extending a length corresponding to the length of a plurality of sections of said first and second circular members and being visible in conjunction with said sections on said first and second circular members; and means formed on said base for permitting adjacent sections of said first, second, third and fourth circular members to be periodically viewed in their respective positions with respect to one another.

9. A catamenial indicator as defined in claim 4 wherein each of said sections is labelled so as to represent the days of the week.

References Cited in the file of this patent

UNITED STATES PATENTS

| | | |
|---|---|---|
| 2,134,928 | Rahn | Nov. 1, 1938 |
| 2,158,553 | Rogers | May 16, 1939 |
| 2,350,219 | Brandao | May 13, 1944 |
| 2,418,207 | Tilbrook | Apr. 1, 1947 |
| 2,493,792 | Walmsley | Jan. 10, 1950 |

FOREIGN PATENTS

| | | |
|---|---|---|
| 430,109 | Great Britain | June 13, 1935 |
| 456,809 | Great Britain | Nov. 16, 1936 |
| 228,961 | Switzerland | Dec. 16, 1943 |
| 309,811 | Switzerland | Nov. 16, 1955 |